US 10,534,072 B2

United States Patent
Shiraishi et al.

(10) Patent No.: US 10,534,072 B2
(45) Date of Patent: Jan. 14, 2020

(54) OBJECT DETECTION DEVICE, POS TERMINAL DEVICE, OBJECT DETECTION METHOD, PROGRAM, AND PROGRAM RECORDING MEDIUM

(71) Applicant: NEC Corporation, Tokyo (JP)

(72) Inventors: Soma Shiraishi, Tokyo (JP); Shoji Yachida, Tokyo (JP)

(73) Assignee: NEC Corporation, Tokyo (JP)

( * ) Notice: Subject to any disclaimer, the term of this patent is extended or adjusted under 35 U.S.C. 154(b) by 696 days.

(21) Appl. No.: 15/120,927

(22) PCT Filed: Feb. 19, 2015

(86) PCT No.: PCT/JP2015/000774
§ 371 (c)(1),
(2) Date: Aug. 23, 2016

(87) PCT Pub. No.: WO2015/125478
PCT Pub. Date: Aug. 27, 2015

(65) Prior Publication Data
US 2016/0370459 A1  Dec. 22, 2016

(30) Foreign Application Priority Data
Feb. 24, 2014  (JP) ................. 2014-033028

(51) Int. Cl.
*G01S 7/48* (2006.01)
*G01B 11/24* (2006.01)
(Continued)

(52) U.S. Cl.
CPC ............ *G01S 7/4802* (2013.01); *G01B 11/24* (2013.01); *G01S 17/08* (2013.01); *G06K 9/00201* (2013.01)

(58) Field of Classification Search
CPC ........ G01S 7/4802; G01S 17/08; G01S 17/36; G01S 17/89; G06K 9/00201
See application file for complete search history.

(56) References Cited

U.S. PATENT DOCUMENTS

2011/0246116 A1* 10/2011 Kamitani ............... G01S 7/4865
702/97
2013/0301907 A1* 11/2013 Shim ...................... G01B 11/02
382/154
(Continued)

FOREIGN PATENT DOCUMENTS

| JP | 48-32556 | 10/1973 |
| JP | 7-168019 | 7/1995 |

(Continued)

OTHER PUBLICATIONS

International Search Report and Written Opinion dated May 12, 2015, in corresponding PCT International Application.
(Continued)

*Primary Examiner* — Eric L Bolda
(74) *Attorney, Agent, or Firm* — Finnegan, Henderson, Farabow, Garrett & Dunner, L.L.P.

(57) ABSTRACT

Provided are an object detection device, POS terminal device, object detection method, and program capable of carrying out appropriate processing according to whether an object is covered by a translucent container. A distance measurement unit measures the distances to each position on an opposing object. An irradiation unit irradiates light onto the object. A reflected light intensity measurement unit measures the intensities of the reflected light that has been irradiated by the irradiation unit and reflected from each position on the object. An object determination unit determines whether the object is covered by a translucent container based on the distances measured by the distance
(Continued)

measurement unit and the reflected light intensities measured by the reflected light intensity measurement unit.

9 Claims, 13 Drawing Sheets

(51) Int. Cl.
*G01S 17/08* (2006.01)
*G06K 9/00* (2006.01)

(56) References Cited

U.S. PATENT DOCUMENTS

2013/0329234 A1* 12/2013 Murakami ............ G01S 7/4912
356/625
2017/0261362 A1* 9/2017 Adam .................. B65F 1/1415

FOREIGN PATENT DOCUMENTS

| | | |
|---|---|---|
| JP | 7-311312 | 11/1995 |
| JP | 2001-216571 | 8/2001 |
| JP | 2007-33104 | 2/2007 |
| JP | 2007-221491 | 8/2007 |
| JP | 2011-128024 | 6/2011 |
| WO | WO 2012/115083 A1 | 8/2012 |
| WO | WO 2013/033442 A1 | 3/2013 |

OTHER PUBLICATIONS

Notification of Reasons for Refusal dated Aug. 21, 2018, in corresponding Japanese Patent Application No. 2016-503980.

Decision to Grant a Patent dated Apr. 2, 2019, in corresponding Japanese Patent Application No. JP 2016-503980.

* cited by examiner

Fig.2
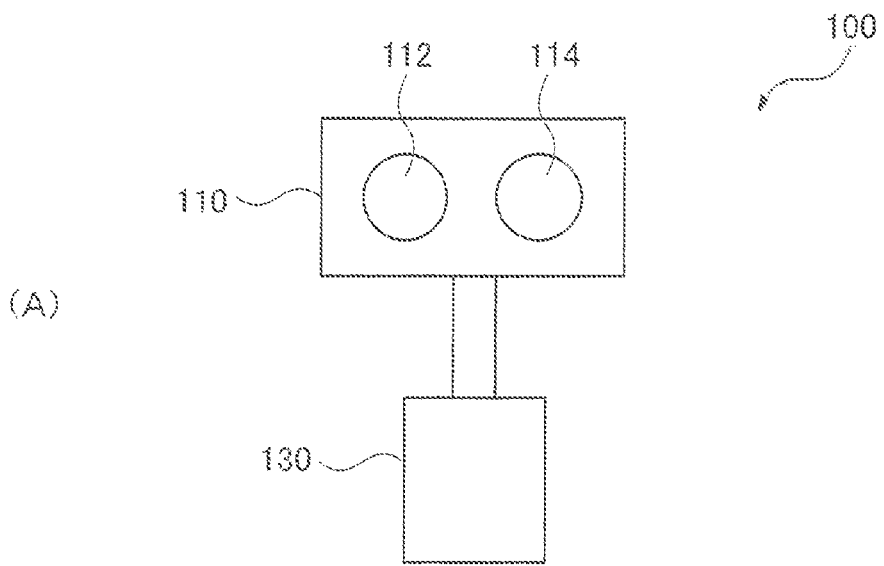
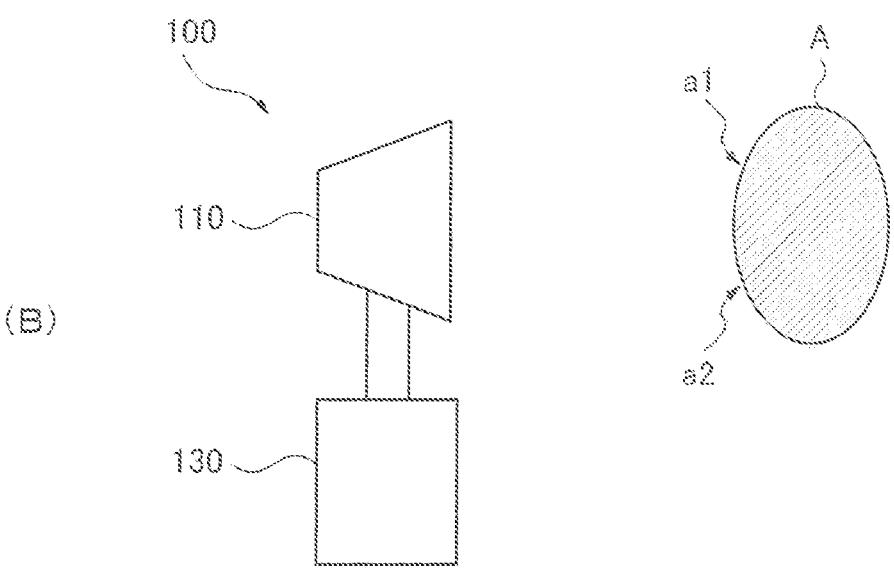

Fig.8
(A) 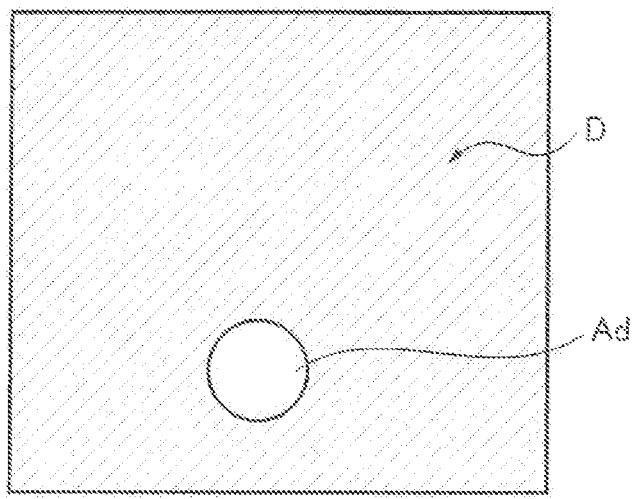
(B) 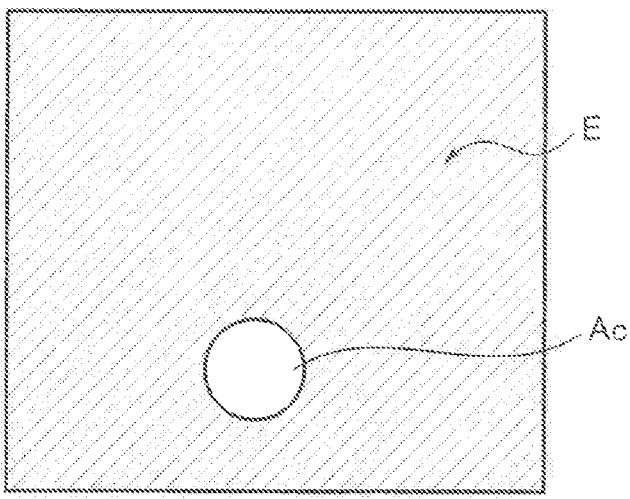

OBJECT DETECTION DEVICE, POS TERMINAL DEVICE, OBJECT DETECTION METHOD, PROGRAM, AND PROGRAM RECORDING MEDIUM

CROSS-REFERENCE TO RELATED PATENT APPLICATIONS

This application is a National Stage Entry of International Application No. PCT/JP2015/000774, filed Feb. 19, 2015, which claims priority from Japanese Patent Application No. 2014-033028, filed Feb. 24, 2014. The entire contents of the above-referenced applications are expressly incorporated herein by reference.

TECHNICAL FIELD

The present invention relates to an object detection device, a POS terminal device, an object detection method, a program and a program recording medium and, in particular, to an object detection device, a POS terminal device, an object detection method and an object detection program that identify a target object.

BACKGROUND ART

Techniques have been recently developed for capturing an image of a target object with an imaging device and recognize the target object. For example, in a POS (Point Of Sales) terminal device installed at a checkout location (checkout counter) of a supermarket, a mass merchandiser or the like, a technique has been proposed in which an image of a commodity item is captured to obtain image data with a camera or the like embedded in the POS terminal and the commodity item is recognized from the obtained image data using an image recognition technique. In technologies such as robotics, an object recognition system which uses a technique such as a three-dimensional laser measurement technique is employed as a system for a robot or the like to recognize a work piece to be operated.

Further, a technique for measuring the distance to an object has been proposed. For example, PTL 1 discloses a three-dimensional imaging device capable of deriving both distance information and color information by itself and obtaining a stereoscopic color image. The three-dimensional imaging device according to PTL 1 includes distance information deriving device that projects light onto an object to be measured, receives reflected light of the projected light from the object to be measured, and derives information indicating the distance to the object to be measured based on information on the received light, and color information deriving device that receives reflected light based on light other than the projected light from the object to be measured and derives information indicating a color of the object to be measured based on information on the received light.

CITATION LIST

Patent Literature

[PTL 1] Japanese Laid-open Patent Publication No. 2011-128024

SUMMARY OF INVENTION

Technical Problem

Target objects such as commodity items or work pieces are sometimes contained in a container such as a translucent plastic bag or a translucent plastic container. In such a case, when a device recognizes a target object, it may incur to decrease a recognition rate with respect to the target object if the device does not have information that the target object is contained in the translucent plastic bag, translucent container or the like. In a case that the recognition rate is low, the device cannot perform proper processing in accordance with whether or not the target object is covered with a translucent container. PTL 1 does not disclose that an object to be measured is contained in a translucent container. The technique described in PTL 1 therefore cannot determine whether or not a target object such as a commodity item or a workpiece is covered with a translucent container.

The present invention is conceived in order to solve the above-mentioned problem. That is, a primary object of the present invention is to provide an object detection device, a POS terminal device, an object detection method, an object detection program and a program recording medium that are capable of performing proper processing in accordance with whether or not a target object is covered with a translucent container.

Solution to Problem

An object detection device of the present invention includes:
a distance measurement unit that measures a distance to each of positions on an object facing itself;
an irradiation unit that emits light ray onto the object;
reflected light intensity measurement unit that measures intensities of light rays emitted by the irradiation unit and reflected at the positions on the object; and
a target object determination unit that determines whether a target object is covered with a translucent container based on the distances measured by the distance measurement unit and the intensities of reflected light rays measured by the reflected light intensity measurement unit.

An object detection device of the present invention includes:
a distance measurement unit that measures a distance to each of positions on an object facing itself;
an irradiation unit that emits light ray onto the object;
a reflected light intensity measurement unit that measures intensities of light rays emitted by the irradiation unit and reflected at the positions on the object; and
an object recognition unit that performs recognition processing concerning target object by distinguishing between a first situation in which the target object is covered with a translucent container and a second situation in which the target object is not covered with the container based on the distance measured by the distance measurement unit and the intensity of reflected light ray measured by the reflected light intensity measurement unit.

A POS terminal device of the present invention includes:
a distance measurement unit that measures a distance to each of positions on a commodity item facing itself;
an irradiation unit that emits light ray onto the commodity item;
a reflected light intensity measurement unit that measures intensities of light rays emitted by the irradiation unit and reflected at the positions on the commodity item; and
an object recognition unit that performs recognition processing concerning the commodity item by distinguishing between a first situation in which the commodity item is covered with a translucent container and a second situation in which the commodity item is not covered with the container based on the distance measured by the distance measurement unit and the intensity of reflected light ray measured by the reflected light intensity measurement unit.

An object detection method of the present invention includes:

measuring a distance to each of positions on an object;
emitting light rays onto the object;
measuring intensities of the light rays emitted onto the object and reflected at the positions on the object; and
determining whether a target object is covered with a translucent container based on the measured distances and the measured intensities of reflected light rays.

An object detection method of the present invention includes:

measuring a distance to each of positions on a facing object;
emitting light ray onto the object;
measuring intensities of the light rays emitted and reflected at the positions on the object; and
performing recognition processing concerning the target object by distinguishing between a first situation in which the target object is covered with a translucent container and a second situation in which the target object is not covered with the container based on the measured distance and the measured intensity of reflected light ray.

A non-transitory program recording medium of the present invention storing a program for causing a computer to perform the steps of:

acquiring a distance to each of positions on a facing object;
acquiring intensities of light rays emitted onto the object and reflected at the positions on the object; and
determining whether a target object is covered with a translucent container based on the acquired distance and the acquired intensities of reflected light rays.

A non-transitory program storage medium of the present invention storing a program for causing a computer to perform the steps of:

acquiring a distance to each of positions on a facing object;
acquiring intensities of light rays emitted onto the object and reflected at the positions on the object; and
performing recognition processing concerning the target object by distinguishing between a first situation in which the target object is covered with a translucent container and a second situation in which the target object is not covered with the container based on the acquired distance and the acquired intensities of reflected light rays.

Advantageous Effects of Invention

The present invention can provide an object detection device, a POS terminal device, an object detection method and an object detection program that are capable of performing proper processing in accordance with whether or not a target object is covered with a translucent container.

BRIEF DESCRIPTION OF DRAWINGS

FIG. 2 is a diagram illustrating an external view of an object detection device according to a first exemplary embodiment.

FIG. 8 is a diagram explaining a processing performed by the object detector in the first exemplary embodiment.

DESCRIPTION OF EMBODIMENTS

Overview of Exemplary Embodiments According to the Invention

Figure 1:
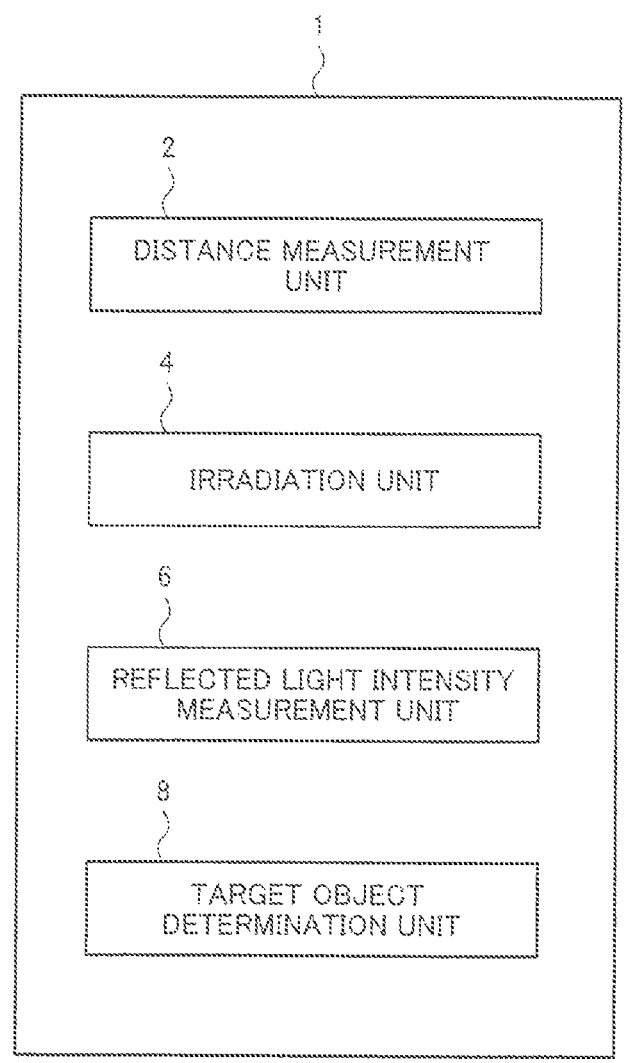
FIG. 1 is a diagram illustrating an overview of an object detection device according to exemplary embodiments of the present invention.

Prior to detailing exemplary embodiments, an overview of exemplary embodiments according to the present invention will be described. FIG. 1 is a diagram illustrating an overview of an object detection device 1 according to an exemplary embodiment. The object detection device 1 includes a distance measurement unit 2, an irradiation unit 4, a reflected light intensity measurement unit 6 and a target object determination unit 8.

The distance measurement unit 2 measures distances to each of positions on an object that faces the object detection device 1. The irradiation unit 4 emits light onto the object. The reflected light intensity measurement unit 6 measures intensity (reflected light intensity) of a reflected light that is emitted to the object by the irradiation unit 4 and is reflected at each of the positions on the object. The target object determination unit 8 determines whether the object (target object) is covered with a translucent container based on the distances measured by the distance measurement unit 2 and the reflected light intensities measured by the reflected light intensity measurement unit 6. The object detection device 1 according to exemplary embodiments enables to perform proper processing in accordance with whether the target object is covered with a translucent container.

First Exemplary Embodiment

An exemplary embodiment of the present invention will be described below with reference to drawings.

Figure 3:
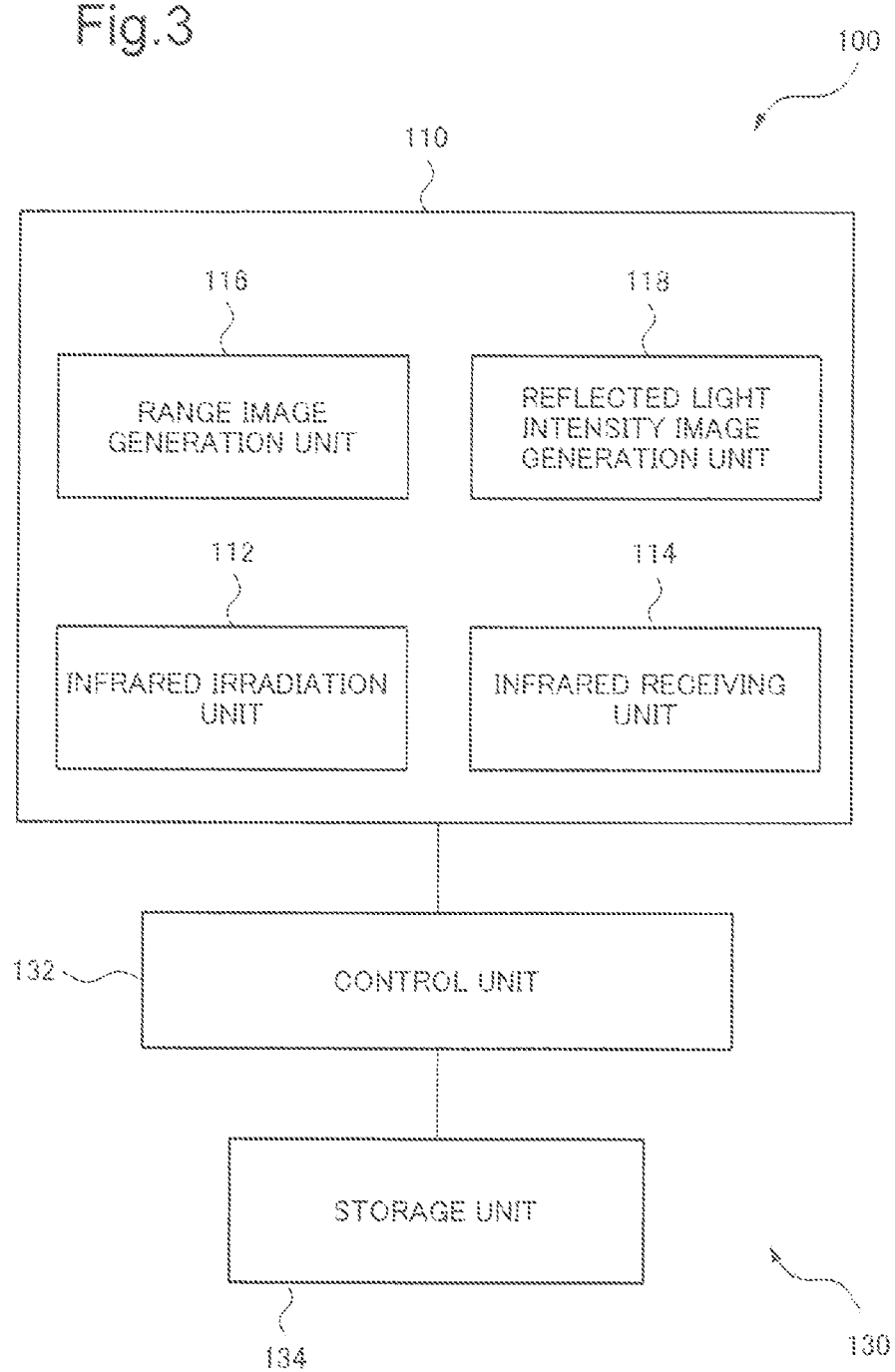
FIG. 3 is a diagram illustrating a hardware configuration of the object detection device according to the first exemplary embodiment.

FIG. 2 is a diagram illustrating an external view of an object detection device 100 of a first exemplary embodiment. A part (A) of FIG. 2 illustrates a front view and a part (B) of FIG. 2 illustrates a side view. FIG. 3 is a diagram illustrating a hardware configuration of the object detection device 100 according to the first exemplary embodiment.

The object detection device 100 includes a range sensor 110 and an information processing apparatus 130. The range sensor 110 measures the distances from the range sensor 110 to each of positions on an object A (see part (B) of FIG. 2) which is directed toward the range sensor 110 using the TOF (Time Of Flight) method, for example. Specifically, the range sensor 110 emits a light ray such as infrared light and measures the distances based on time it takes for emitted light ray to travel to and return from positions on the object A. Note that while infrared light is emitted in the present exemplary embodiment, the present invention is not limited to this. For example, the range sensor 110 may use light in a spectrum of wavelengths other than infrared light. The range sensor 110 also may emit infrared light by oscillation of a laser.

The range sensor 110 includes an infrared irradiation unit 112, an infrared receiving unit 114, a range image generation unit 116 and a reflected light intensity image generation unit 118. The infrared irradiation unit 112 emits pulsed infrared light (for example an NIR (Near Infrared) light) toward the object A facing the infrared irradiation unit 112. When the object A is located near the range sensor 110, the infrared light emitted by the infrared irradiation unit 112 is reflected by the object A. The infrared receiving unit 114 is, for example, an image sensor (such as a CCD (Charge-Coupled Device) or an CMOS (Complementary Metal-Oxide Semiconductor)). This infrared receiving unit 114 receives infrared light reflected by the object A. The pixels of the infrared receiving unit 114 receive light reflected from positions on the object A.

The range image generation unit 116 calculates the distance (depth) to an object based on the difference between the time at which the infrared irradiation unit 112 has emitted infrared light and the time at which the infrared receiving unit 114 has received reflected light. Specifically, the infrared irradiation unit 112 and the infrared receiving unit 114 are configured to synchronize with each other and the range image generation unit 116 measures the phase difference between the phase of infrared light emitted by the infrared irradiation unit 112 and the phase of reflected light received by the infrared receiving unit 114 to measure the time difference.

More specifically, the range image generation unit 116 measures the time difference for each of light rays reflected from positions on the object A and received by the infrared receiving unit 114 and measures the distance to each of the positions. In other words, the range image generation unit 116 measures the distance for each reflected light rays received by each of the pixels of the infrared receiving unit 114. Based on the distances, the range image generation unit 116 generates a range image (three-dimensional image) which is a set of pixels representing the distances to positions on the object A. Note that hereinafter the term "range image" also means "image data indicating a range image" which is to be processed in information processing.

For example, in the range image, the pixel corresponding to the position at a distance of 15 cm from the range sensor 110 includes distance information representing a "distance of 15 cm". Further, in the range image, the pixel corresponding to the position at a distance of 30 cm from the range sensor 110 includes distance information representing a "distance of 30 cm".

Note that if the object A is too close to the range sensor 110, a phase difference between emitted light and reflected light cannot be detected and no time difference can be measured. Consequently, the range image generation unit 116 cannot measure the distance to the object A. To avoid this, the distance between the range sensor 110 and the object A may be kept according to the minimum time difference (phase difference) measurable by the range sensor 110. Specifically, the range sensor 110 may be designed to be placed at a distance apart from the object A so that a minimum measurable distance is ensured. The speed of infrared light (the speed of light) is 300,000 km/sec. and therefore infrared light travels 30 cm per nanosecond. In other words, when the distance between the range sensor 110 and the object changes by 15 cm (by a round-tip distance of 30 cm), the time that elapses between emission of light and reception of reflected light changes by 1 nanosecond. Therefore, if the minimum measurable time difference is 1 nanosecond, the minimum measurable distance is 15 cm.

The reflected light intensity image generation unit 118 measures the intensity of reflected light (reflected light intensity) received by the infrared receiving unit 114. More specifically, the reflected light intensity image generation unit 118 measures the light intensity of light reflected from each of positions on the object A and received by the infrared receiving unit 114. In other words, the reflected light intensity image generation unit 118 measures the light intensity of reflected light received by each of the pixels of the infrared receiving unit 114. Based on the measurements, the reflected light intensity image generation unit 118 generates a reflected light intensity image which is a set of pixels indicating the intensities of light rays reflected from the positions on the object A. Note that hereinafter the term "reflected light intensity image" also means "image data indicating a reflected light intensity image" which is to be processed in information processing. Further, the reflected light intensity may be luminance, lightness, or illuminance, for example. The reflected light intensities may represent values of electrical signals converted from the intensities (brightness and darkness) of light rays by photoelectric conversion at the infrared receiving unit 114.

For example, if the intensity of light reflected from a position a1 on the object A is C1, the pixel that corresponds to the position a1 in the reflected light intensity image includes reflected light intensity information indicating the reflected light intensity C1. If the intensity of light reflected from a position a2 on the object A is C2, the pixel that corresponds to the position a2 in the reflected light intensity image includes reflected light intensity information indicating the reflected light intensity C2.

As described above, each pixel of the infrared receiving unit 114 receives light reflected from its corresponding position on the object A. Accordingly, the positions related to the pixels in the reflected light intensity image correspond respectively to the positions related to the pixels in the range image.

Specifically, when the position a1 on the object A related to a pixel position (X1, Y1) in the range image, the position a1 substantially related to the pixel position (X1, Y1) in the reflected light intensity image as well. In other words, the pixel positions in the reflected light intensity image acquired by the range sensor 110 correspond respectively to the pixel positions in the range image.

Now, the object A at the position a1 is made of an opaque material that does not allow light to path through it and the object A at the position a2 is made of a translucent material that allows some light to pass through it are compared with each other. In this case, at the position a1, almost all of infrared light emitted from the infrared irradiation unit 112 is reflected. At the reflected position a2, on the other hand, only some of the infrared light emitted from the infrared irradiation unit 112 is reflected. Accordingly, the reflected light intensity C1 of light reflected at the position a1 is greater than the reflected light intensity C2 of light reflected at the position a2. For example, if the object A is a target object covered with a translucent container, the position a1 corresponds to the target object whereas the position a2 corresponds to the translucent container. In this case, the reflected light intensity (C2) of light reflected on the translucent container can be significantly smaller than the reflected light intensity (C1) of light reflected on the target object. Examples of translucent container include a plastic bag packaging fruit or vegetables at supermarkets or the like, or a plastic container through which the contents is visible.

Note that the "translucent container" may be a bag that is made of a material such as soft plastic and has an indefinite shape, for example, or may be a solid container made of a material such as hard plastic, for example. The phrase "a target object is covered with a translucent container" means not only that the target object is completely covered with the translucent container but also means that at least only a portion of the target object that faces the range sensor 110 is covered with the translucent container. In other words, the notion that "a target object is covered with the translucent container" encompasses not only a state in which the target object is enclosed within the translucent container but also other states of the target object. The notion implies that at least the surface of the target object that faces the range sensor is covered with the translucent container and other surface (for example the surface opposite from the range sensor) of the target object is not necessarily covered with the translucent container.

Further, if the target object is covered with the translucent container, the infrared receiving unit 114 receives light reflected by the translucent container and light that has passed through the translucent container and has been reflected by the target object. In this case, the infrared receiving unit 114 may perform processing about the reflected light that has the greater light intensity out of the reflected light rays, namely the light that has passed through the translucent container and has been reflected by the target object. In other words, the range image generation unit 116 and the reflected light intensity image generation unit 118 may use light that has passed through the translucent container and has been reflected by the target object of the reflected light rays to generate the range image and the reflected light intensity image respectively.

The information processing apparatus 130 is a computer, for example. The information processing apparatus 130 includes a control unit 132 such as a CPU (Central Processing Unit) and a storage unit 134 such as a memory or a hard disk. The information processing apparatus 130 performs required processes such as detection of an object that depends on information acquired by the range sensor 110.

Figure 4:
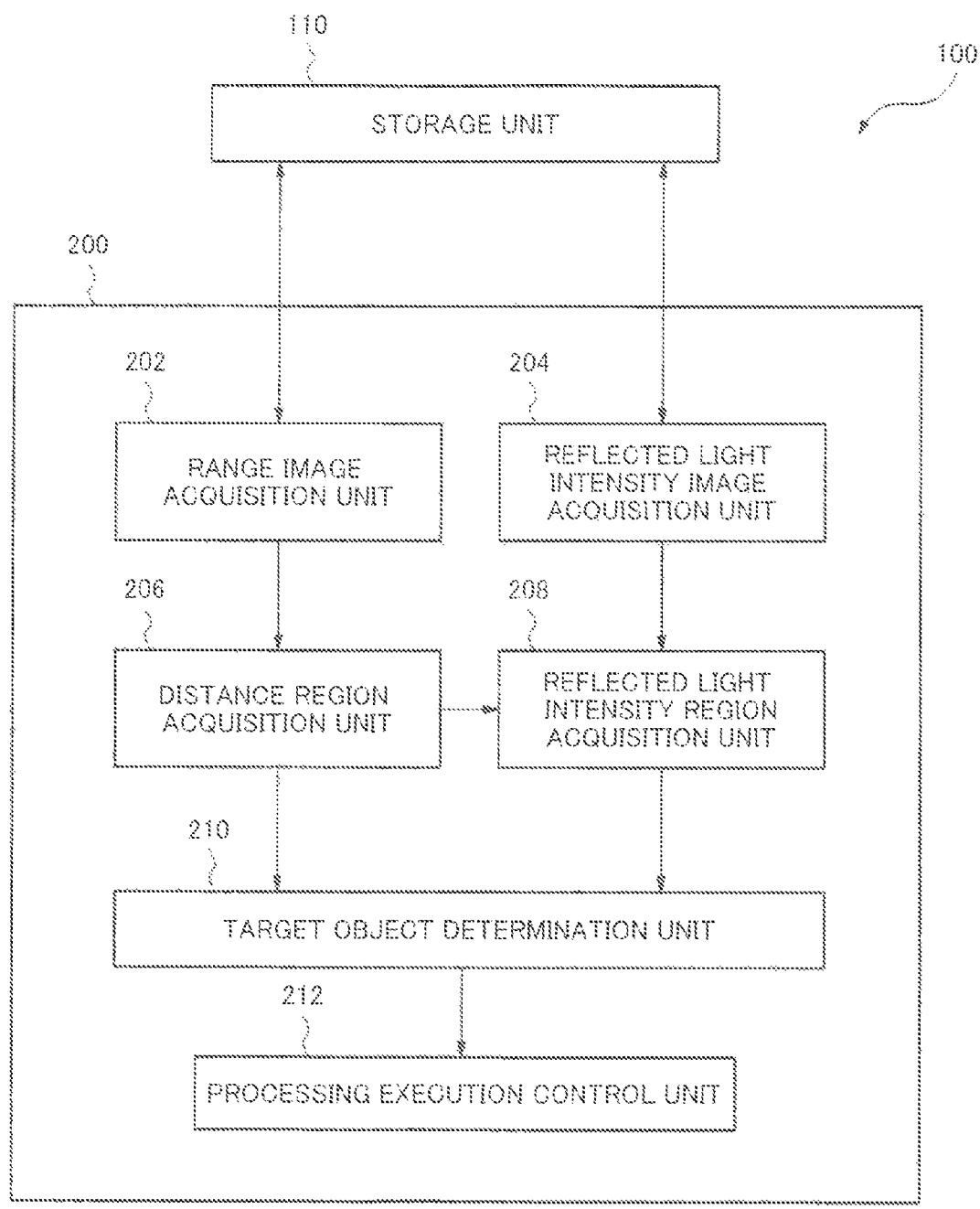
FIG. 4 is a functional block diagram of the object detection device according to the first exemplary embodiment.
Figure 5:
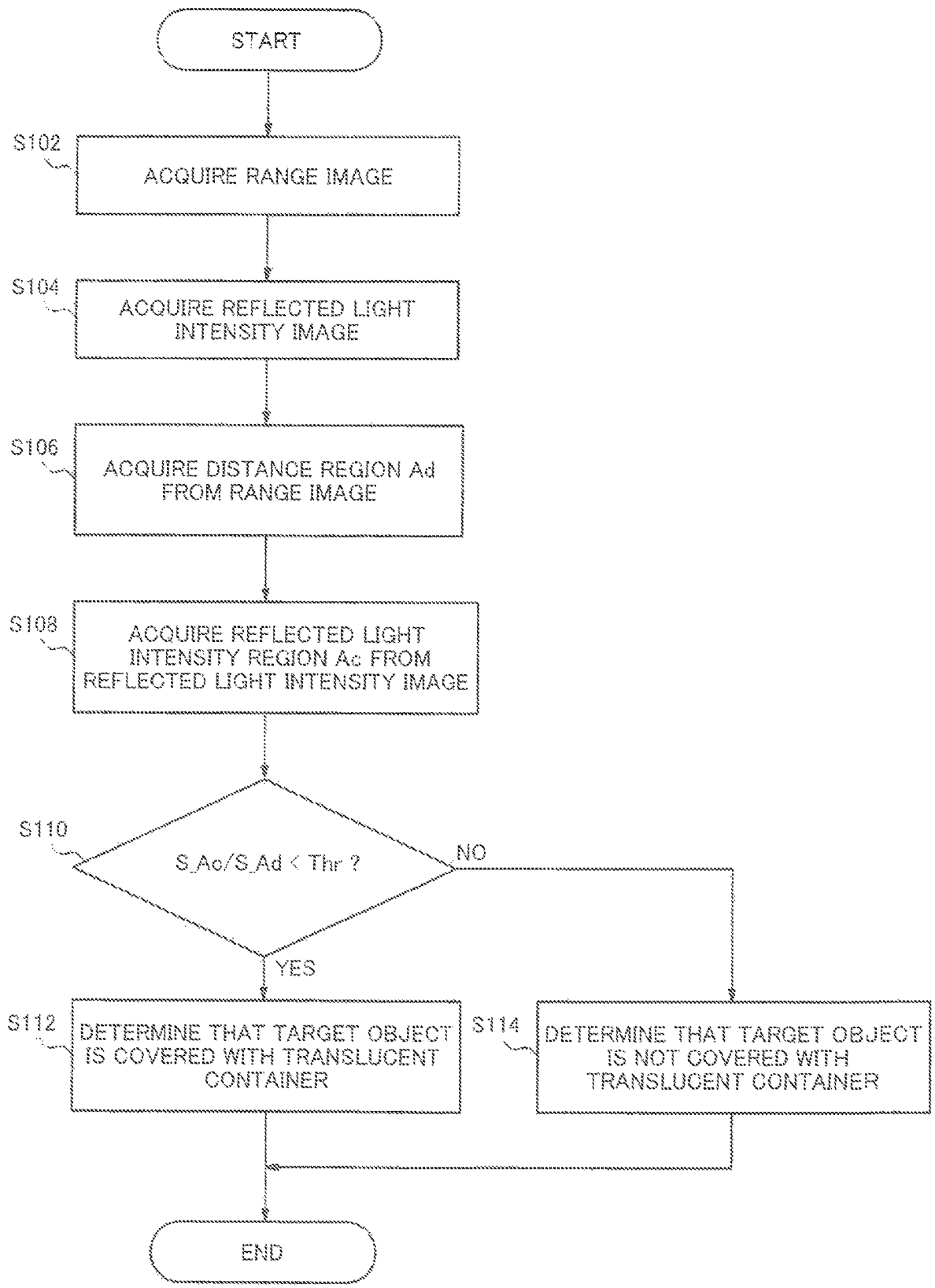
FIG. 5 is a flowchart illustrating a processing performed by the object detection device according to the first exemplary embodiment.

FIG. 4 is a functional block diagram of the object detection device 100 according to the first exemplary embodiment. FIG. 5 is a flowchart illustrating a processing performed by the object detection device 100 according to the first exemplary embodiment. The object detection device 100 includes an object detector 200. The object detector 200 includes a range image acquisition unit 202, a reflected light intensity image acquisition unit 204, a distance region acquisition unit 206, a reflected light intensity region acquisition unit 208, a target object determination unit 210, and a processing execution control unit 212.

Note that the object detector 200 can be implemented by causing the control unit 132 to execute a program, for example. More specifically, the object detector 200 is implemented by executing the program stored in the storage unit 134 with the control unit 132. The components are not limited to software implementations by the program but instead may be implemented by any combinations of hardware, firmware and software. The components of the object detector 200 may be implemented by using an integrated circuit, such as a FPGA (field-programmable gate array) or a microcomputer that can be programmed by a user.

In that case, this integrated circuit may be used to implement the program made up of the components described above. The same applies to other exemplary embodiments which will be described later.

When the object A faces the range sensor 110, the object detector 200 determines whether the object A is the target object covered with the translucent container, as will be described later. The phrase "the object A is a target object covered with a translucent container (in a first situation)" means a situation in which the target object is contained in the translucent container, for example. In other words, the object A in this case is constituted by the translucent container and the target object. On the other hand, the phrase "the object A is a target object that is not covered with a translucent container (in a second situation)" means a situation in which the target object is not contained in the translucent container, for example. In other words, the object A in this case is constituted by only the target object.

A processing performed by the object detector 200 will be described below in detail.

The range image acquisition unit 202 controls the range sensor 110 to acquire a range image (S102). Specifically, the range image acquisition unit 202 controls the range sensor 110 so as to capture a range image of the object A that faces the range sensor 110. In response to the control of the range image acquisition unit 202, the range sensor 110 captures the range image of the object A that faces the range sensor 110, thereby generating the range image (image data representing the range image). The range image acquisition unit 202 acquires the generated range image and outputs the range image to the distance region acquisition unit 206.

The reflected light intensity image acquisition unit 204 controls the range sensor 110 to acquire a reflected light intensity image (S104). Specifically, the reflected light intensity image acquisition unit 204 controls the range sensor 110 so as to capture the reflected light intensity image of the object A that faces the range sensor 110. In response to the control of the reflected light intensity image acquisition unit 204, the range sensor 110 captures the reflected light intensity image of the object A that faces the range sensor 110, thereby generating the reflected light intensity image (image data representing the reflected light intensity image). The reflected light intensity image acquisition unit 204 acquires the generated reflected light intensity image and outputs the reflected light intensity image to the reflected light intensity region acquisition unit 208.

The distance region acquisition unit 206 acquires information on a distance region Ad (a first region) that is within a predetermined range S1 (a first range) of distances from the range sensor 110 in the range image (S106). Specifically, the distance region acquisition unit 206 extracts pixels that represent distances within the range S1 from the range image. The distance region acquisition unit 206 then acquires a region made up of the extracted pixels as the distance region Ad.

Note that the lower bound of the range S1 may be the minimum distance measurable by the range sensor 110, for example. The upper bound of the range S1 is set by taking into consideration how close to the range sensor 110 a user may bring the object A when the user directs the object A toward the range sensor 110 in order to allow the range sensor 110 to detect the object A. For example, if the minimum distance measurable by the range sensor 110 is 15 cm, the range S1 may satisfy 15 cm<S1<30 cm. Note that the lower bound of the range S1 may not be set; in that case, the lower bound is 0 cm.

The reflected light intensity region acquisition unit 208 acquires information on a reflected light intensity region Ac (a second region) having reflected light intensity greater than or equal to a predetermined intensity threshold Thc in the reflected light intensity image within the distance region Ad (S108). Specifically, the reflected light intensity region acquisition unit 208 first extracts pixels (pixels in the reflected light intensity image) corresponding to the pixels in the distance region Ad (pixels in the range image) from the reflected light intensity image. The reflected light intensity region acquisition unit 208 also extracts pixels having reflected light intensity greater than or equal to the intensity threshold Thc among the pixels corresponding to the distance region Ad. In addition, the reflected light intensity region acquisition unit 208 acquires information on a region made up of the extracted pixels as the reflected light intensity region Ac.

Note that the intensity threshold Thc may be the maximum value that the intensity of light reflected by the translucent container can take. If the reflected light intensity at a pixel is greater than or equal to the intensity threshold Thc, it is conceivable that the reflected light corresponding to the pixel is light reflected by the target object which is opaque. In other words, if the reflected light intensity at a pixel is smaller than the intensity threshold Thc, it is conceivable that the reflected light corresponding to the pixel is light reflected by the translucent container.

The target object determination unit 210 determines whether an area ratio S_Ac/S_Ad of an area S_Ac of the reflected light intensity region Ac to the area S_Ad of the distance region Ad is less than a predetermined threshold Thr (S110). Specifically, the target object determination unit 210 calculates the area S_Ad of the distance region Ad. The area S_Ad may be equivalent to the number of the pixels included in the distance region Ad. Similarity, the target object determination unit 210 calculates the area S_Ac of the reflected light intensity region Ac. The area S_Ac may be equivalent to the number of the pixels included in the reflected light intensity region Ac. The target object determination unit 210 divides the area S_Ac by the area S_Ad to obtain the area ratio S_Ac/S_Ad. The target object determination unit 210 then compares the area ratio S_Ac/S_Ad with the threshold Thr.

If the area ratio S_Ac/S_Ad is less than the threshold Thr (YES at S110), the target object determination unit 210 determines that the target object is covered with the translucent container (S112). Then the processing execution control unit 212 may execute a processing to be executed when the target object is covered with the translucent container. On the other hand, if the area ratio S_Ac/S_Ad is greater than or equal to the threshold Thr (NO at S110), the target object determination unit 210 determines that the target object is not covered with the translucent container (S114). Then the processing execution control unit 212 may execute a processing to be executed when the target object is not covered with the translucent container (i.e. when the target object is exposed). The processing performed by the processing execution control unit 212 can be determined as appropriate in accordance with an apparatus to which the object detection device 100 according to the present exemplary embodiment is applied. Note that the processing execution control unit 212 is not an essential component and may be incorporated into any apparatus connected to the object detection device 100.

The threshold Thr can be typically determined by taking into consideration the proportion of the target object relative to the translucent container in the surface facing the range sensor 110 when the target object is covered with the translucent container. For example, the threshold Thr may be set to be ½. Note that reflected light intensities at pixels that correspond to positions very close to the target object may be high due to diffraction or other phenomena although the target object does not actually exist. Therefore the threshold Thr is preferably a value smaller than 1.

Figure 6:
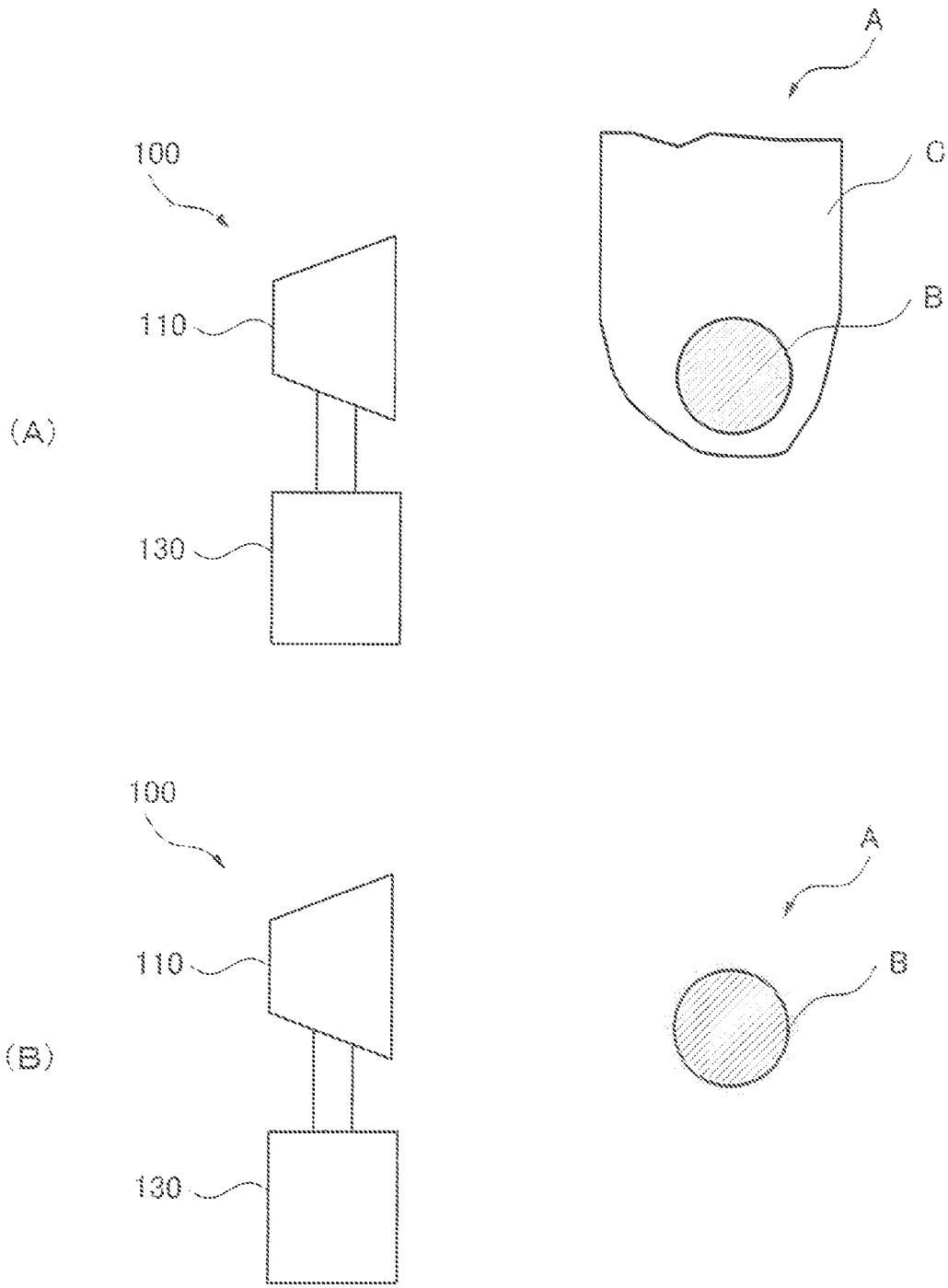
FIG. 6 is a diagram explaining a processing performed by an object detector in the first exemplary embodiment.
Figure 7:
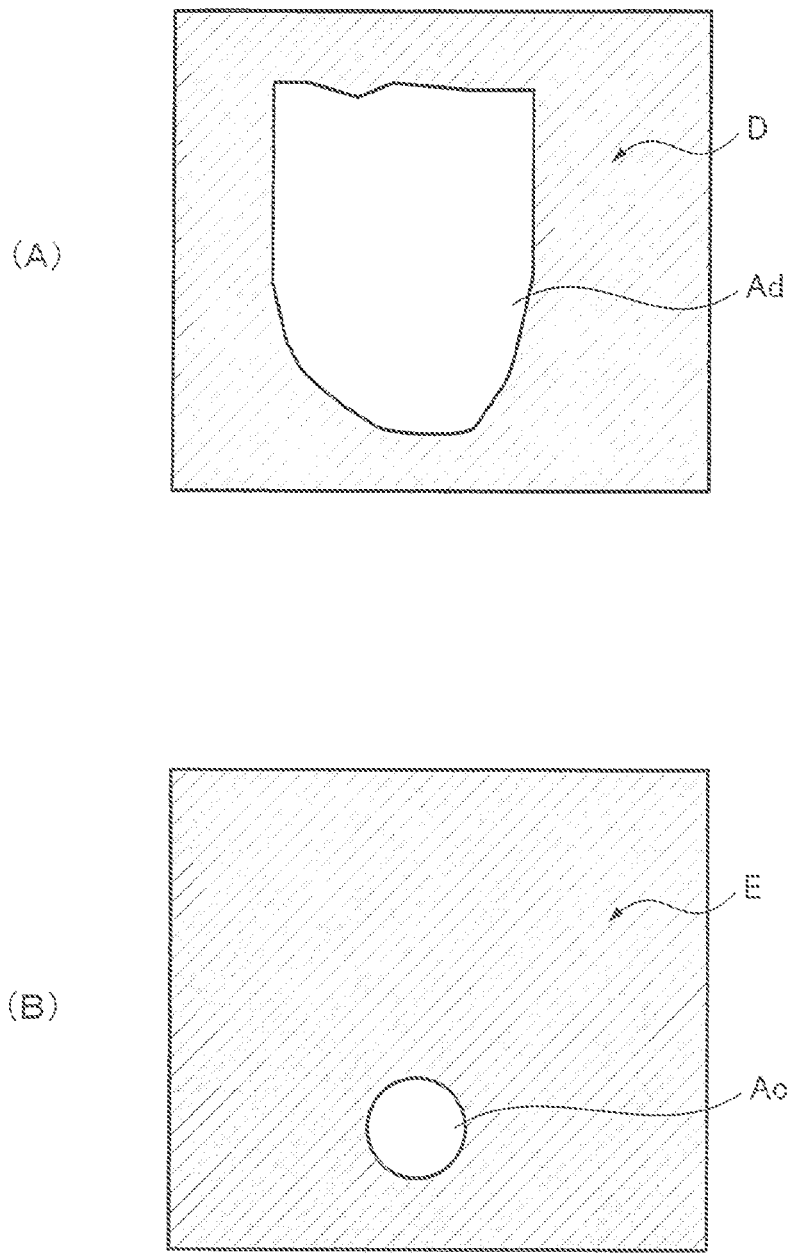
FIG. 7 is a diagram explaining a processing performed by the object detector in the first exemplary embodiment.

FIGS. 6 to 8 are diagrams explaining processing performed by the object detector 200 according to the first exemplary embodiment.

A part (A) of FIG. 6 illustrates a situation (the first situation) in which, when the target object B is covered with the translucent container C and thereby the object A is constituted by the target object B and the translucent container C, the object A faces the range sensor 110 of the object detection device 100. Further, a part (B) of FIG. 6 illustrates a situation (the second situation) in which, when the object A is constituted by the target object B that is not covered with the translucent container, the object A (the target object B) faces the range sensor 110 of the object detection device 100.

First, a processing performed in the object detector 200 in the situation illustrated in the part (A) of FIG. 6 will be described. At step S102, the range image acquisition unit 202 acquires a range image concerning the object A, which has been generated by the range sensor 110. Similarly, at step S104, the reflected light intensity image acquisition unit 204 acquires the reflected light intensity image concerning the object A, which has been generated by the range sensor 110. At step S106, the distance region acquisition unit 206 acquires the distance region Ad concerning the object A using the range image acquired by the range image acquisition unit 202. Similarly, at step S108, the reflected light intensity region acquisition unit 208 acquires the reflected light intensity region Ac concerning the object A using the reflected light intensity image acquired by the reflected light intensity image acquisition unit 204.

FIG. 7 is a diagram illustrating the distance region Ad and the reflected light intensity region Ac that are acquired in the situation in the part (A) of FIG. 6. That is, in FIG. 7, a part (A) illustrates the distance region Ad and a part (B) illustrates the reflected light intensity region Ac. The target object B and the translucent container C of the object A are located within the range S1 based on distances from the range sensor 110. The distance region acquisition unit 206 therefore acquires the distance region Ad as illustrated in the part (A) of FIG. 7. Because the target object B is covered with the translucent container C, the distance region Ad is generated such that the distance region Ad indicates the location that substantially corresponds to the translucent container C. Note that the hatch-pattern region indicated by D represents positions at distances from the range sensor 110 that deviate from the range S1 (such as the background). This means that, around the translucent container C, there is no object at a distance from the range sensor 110 that is within the range S1.

The intensity of light reflected by the translucent container C is smaller than the intensity threshold Thc. Further, the intensity of light that has passed through the translucent container C and has been reflected by the target object B is greater than or equal to the intensity threshold Thc. Further, the target object B is covered with the translucent container C. The reflected light intensity region acquisition unit 208 therefore acquires the reflected light intensity region Ac as illustrated in the part (B) of FIG. 7. The reflected light intensity region Ac is generated such that the reflected light intensity region Ac indicates the location that substantially corresponds to the target object B contained in the translucent container C. Note that the hatch-pattern region indicated by E represents positions that are outside the distance region Ad and positions that are within the distance region Ad but have reflected light intensities smaller than the intensity threshold Thc.

At step S110, the target object determination unit 210 calculates the area ratio S_Ac/S_Ad between the area S_Ad of the distance region Ad illustrated in the part (A) of FIG. 7 and the area S_Ac of the reflected light intensity region Ac illustrated in the part (B) of FIG. 7. In this case, the area ratio S_Ac/S_Ad is smaller than the threshold Thr (for example 1/2). The target object determination unit 210 therefore determines that the target object B is covered with the translucent container C.

Next, a processing performed in the object detector 200 in the situation illustrated in the (B) of FIG. 6 will be descried. As in the situation in the part (A) of FIG. 6, at step S106, the distance region acquisition unit 206 acquires the distance region Ad concerning the object A using the range image acquired by the range image acquisition unit 202. Similarly, at step S108, the reflected light intensity region acquisition unit 208 acquires the reflected light intensity region Ac concerning the object A using the reflected light intensity image acquired by the reflected light intensity image acquisition unit 204.

FIG. 8 is a diagram illustrating the distance region Ad and the reflected light intensity region Ac which are acquired in the situation in part (B) of FIG. 6. That is, in FIG. 8, a part of (A) illustrates the distance region Ad and a part of (B) illustrates the reflected light intensity region Ac. The object A (target object B) is located at a distance from the range sensor 110 that is within the range S1. Accordingly, the distance region acquisition unit 206 acquires the distance region Ad as illustrated in the part (A) of FIG. 7. Because the object A is constituted only by the target object B (i.e. the target object B is not covered with the translucent container C), the distance region Ad is generated so that the distance region Ad indicates a location that substantially corresponds to the target object B. Note that the hatch-pattern region indicated by D represents positions at distances from the range sensor 110 that deviate from the range S1 (such as the background). This means that, around the target object B, there is no object at a distance from the range sensor 110 that is within the range S1.

The intensity of light reflected by the target object B is greater than or equal to the intensity threshold Thc. Further, the target object B is not covered with the translucent container C. The reflected light intensity region acquisition unit 208 therefore acquires the reflected light intensity region Ac as illustrated in the part (B) of FIG. 8. The reflected light intensity region Ac is generated such that the reflected light intensity region Ac indicates the location that substantially corresponds to the target object B. Note that the hatch-pattern region indicated by E represents positions that are outside the distance region Ad and positions that are within the distance region Ad but have reflected light intensities smaller than the intensity threshold Thc. In this case, the distance region Ad and the reflected light intensity region Ac substantially coincide with one another.

Then, at step S110, the target object determination unit 210 calculates the area ratio S_Ac/S_Ad between the area S_Ad of the distance region Ad illustrated in the part (A) of FIG. 8 and the area S_Ac of the reflected light intensity region Ac illustrated in the part (B) of FIG. 8. The area ratio S_Ac/S_Ad in this case is greater than or equal to the threshold Thr (for example 1/2). The target object determination unit 210 therefore determines that the target object B is not covered with the translucent container.

In this way, according to the present exemplary embodiment, it is possible to determine whether the target object is covered with the translucent container. It is difficult to determine whether an object is covered with the translucent container by capturing an image of the object and performing simply recognition processing for the image of the object. In contrast, according to the present exemplary embodiment, as described above, the processing to determine whether the target object is covered with the translucent container is performed using the distance to an object measured with the range sensor 110 and the intensity of light reflected by the object. Accordingly, when the target object is covered with the translucent container, it is possible to perform a processing suited for a situation in which the target object is covered with the translucent container. When the target object is not covered with the translucent container, it is possible to perform a processing suited for a situation in which the target object is not covered with the translucent container.

Second Exemplary Embodiment

Next, a second exemplary embodiment will be described. The second exemplary embodiment differs from the first exemplary embodiment in that target object recognition processing is performed in the second exemplary embodiment. Note that components that are in essence similar to those of the first exemplary embodiment are given the same reference numerals and the description of those components will be omitted.

Figure 9:
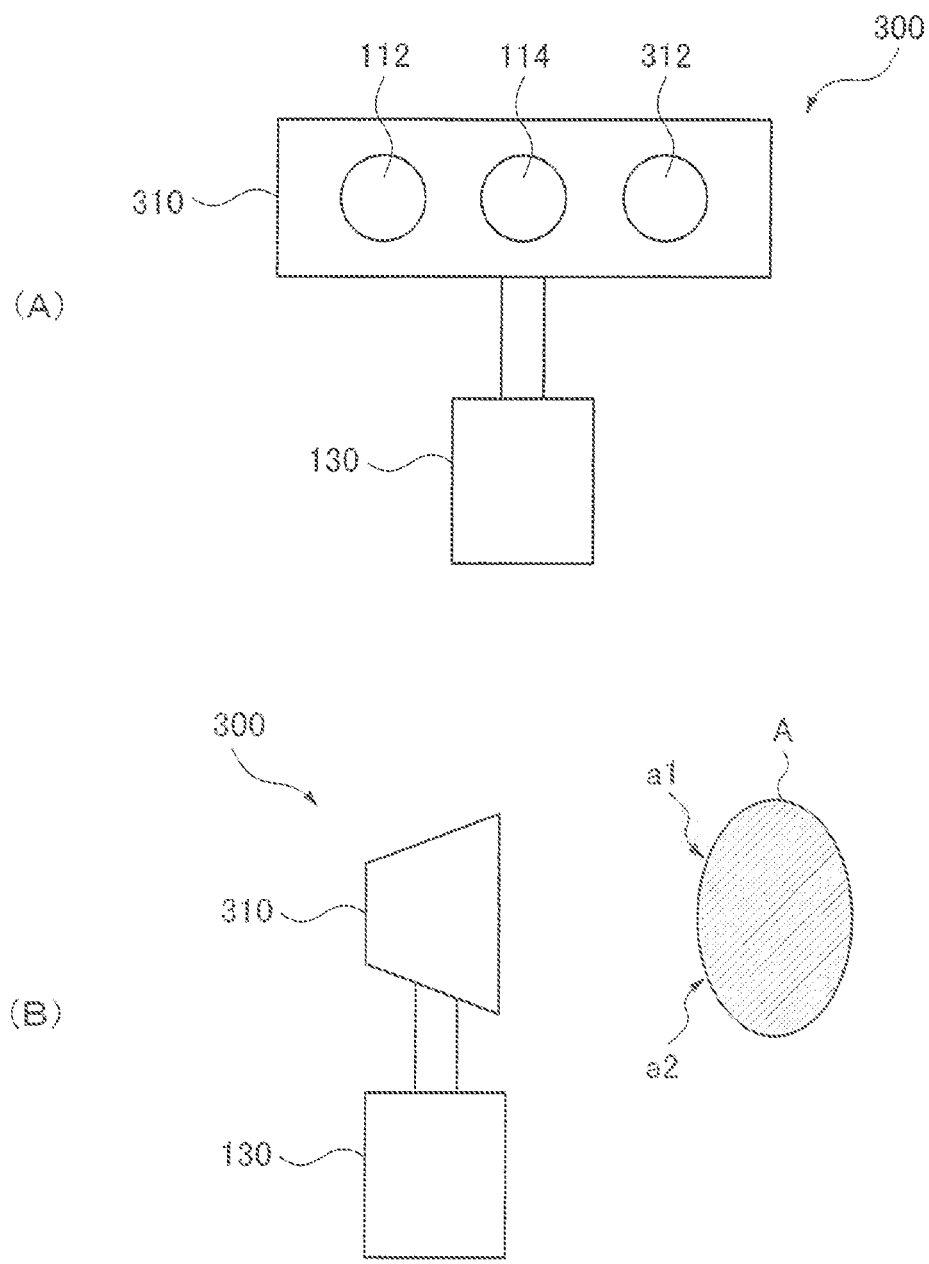
FIG. 9 is a diagram illustrating an external view of an object detection device according to a second exemplary embodiment.
Figure 10:
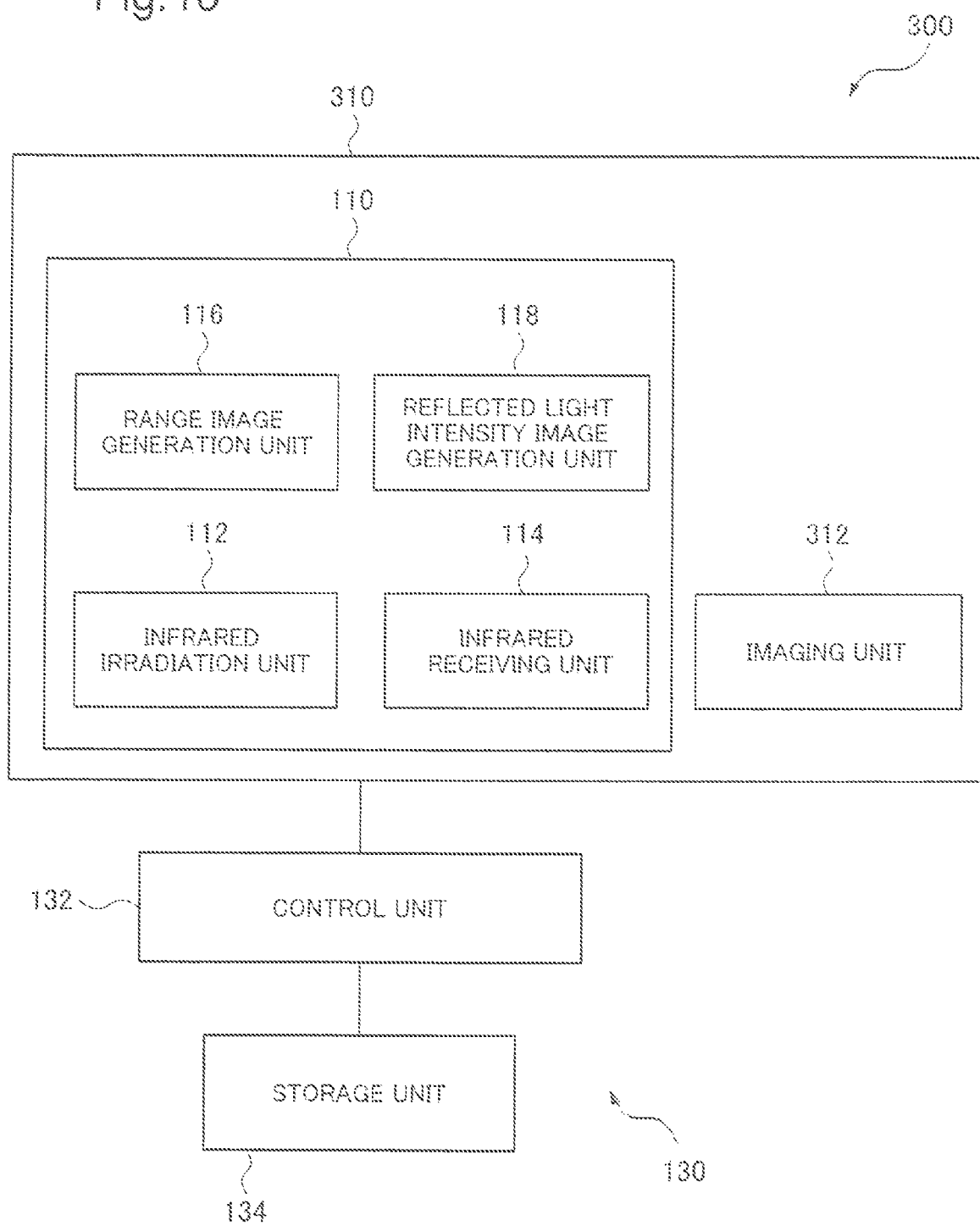
FIG. 10 is a diagram illustrating a hardware configuration of the object detection device according to the second exemplary embodiment.

FIG. 9 is a side view illustrating an external view of an object detection device 300 according to the second exemplary embodiment. That is, a part (A) of FIG. 9 illustrates a front view and a part (B) of FIG. 9 illustrates a side view. FIG. 10 is a diagram illustrating a hardware configuration of the object detection device 300 according to the second exemplary embodiment.

The object detection device 300 includes a three-dimensional camera 310 and an information processing apparatus 130. The three-dimensional camera 310 includes an imaging unit 312 and a range sensor 110 similar to the one in the first exemplary embodiment. The imaging unit 312 is an imaging device (camera) such as a CCD and, for example, performs processing to capture an image of an object. Specifically, the imaging unit 312 captures an object directed toward the three-dimensional camera 310 and generates a two-dimensional color image or monochrome image (two-dimensional image) which includes the image of the object. Note that hereinafter the term "two-dimensional image" hereinafter also refers to "image data representing a two-dimensional image" which is to be processed in information processing.

The imaging unit 312 and the range sensor 110 are placed close to one another (i.e. in roughly the same location). Accordingly, the two-dimensional image acquired by the imaging device 312 and the range image and the reflected light intensity image acquired by the range sensor 110 are generated to correspond to one another. Specifically, if the position a1 on the object A corresponds to the pixel position (X1, Y1) in the two-dimensional image, the position a1 substantially corresponds to the pixel position (X1, Y1) in both of the range image and the reflected light intensity image. In other words, the pixel positions in the range image and the reflected light intensity image acquired by the range sensor 110 correspond to the pixel positions in the two-dimensional image, respectively. Note that if the location of the imaging unit 312 and the location of the range sensor 110 are slightly different from one another, processing may be performed for aligning the pixel positions in the range image (and the reflected light intensity image) and the pixel positions in the two-dimensional image with one another based on the distance between the imaging unit 312 and the range sensor 110 and the view angle of each of the imaging unit 312 and the range sensor 110.

Figure 11:
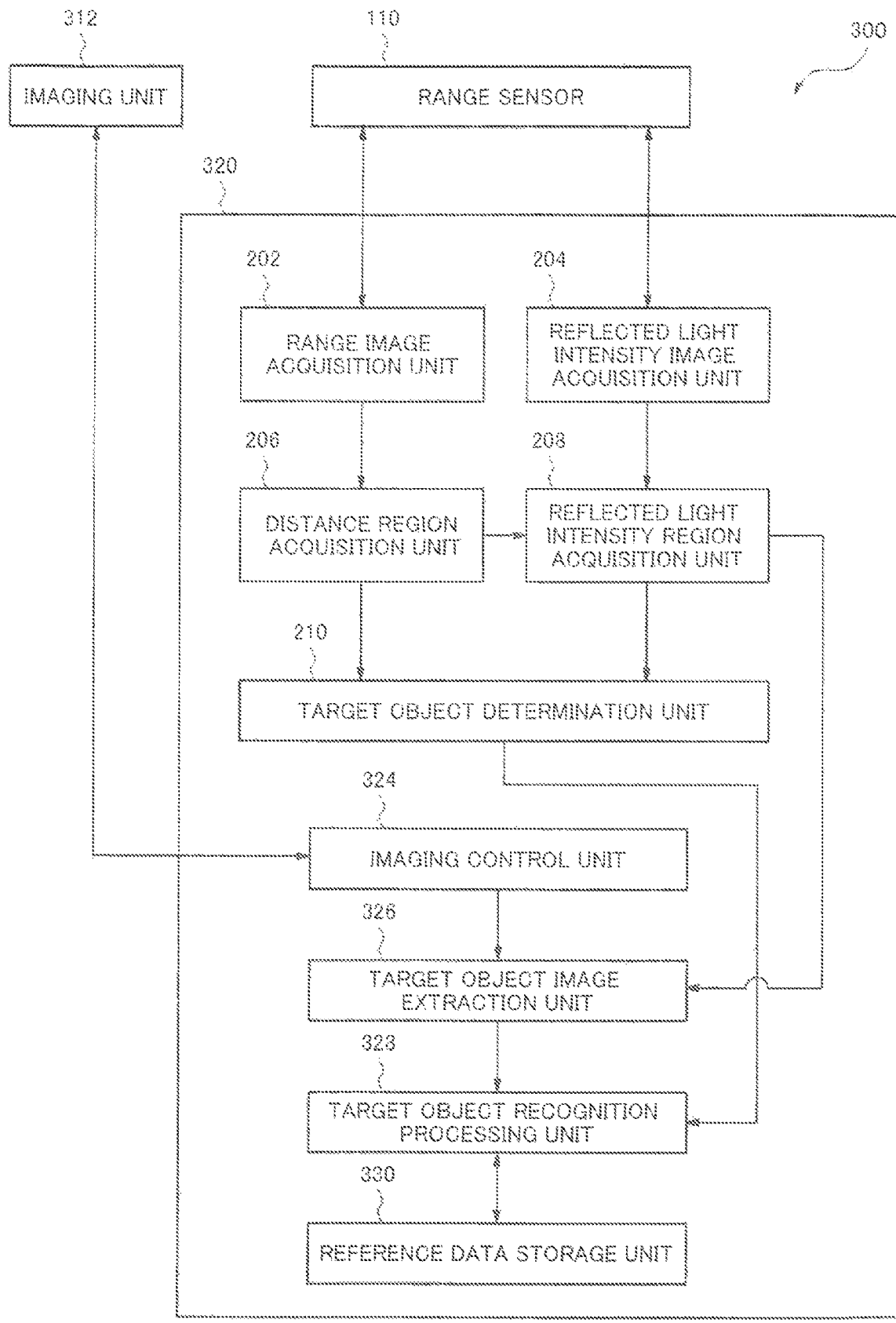
FIG. 11 is a functional block diagram of the object detection device according to the second exemplary embodiment.
Figure 12:
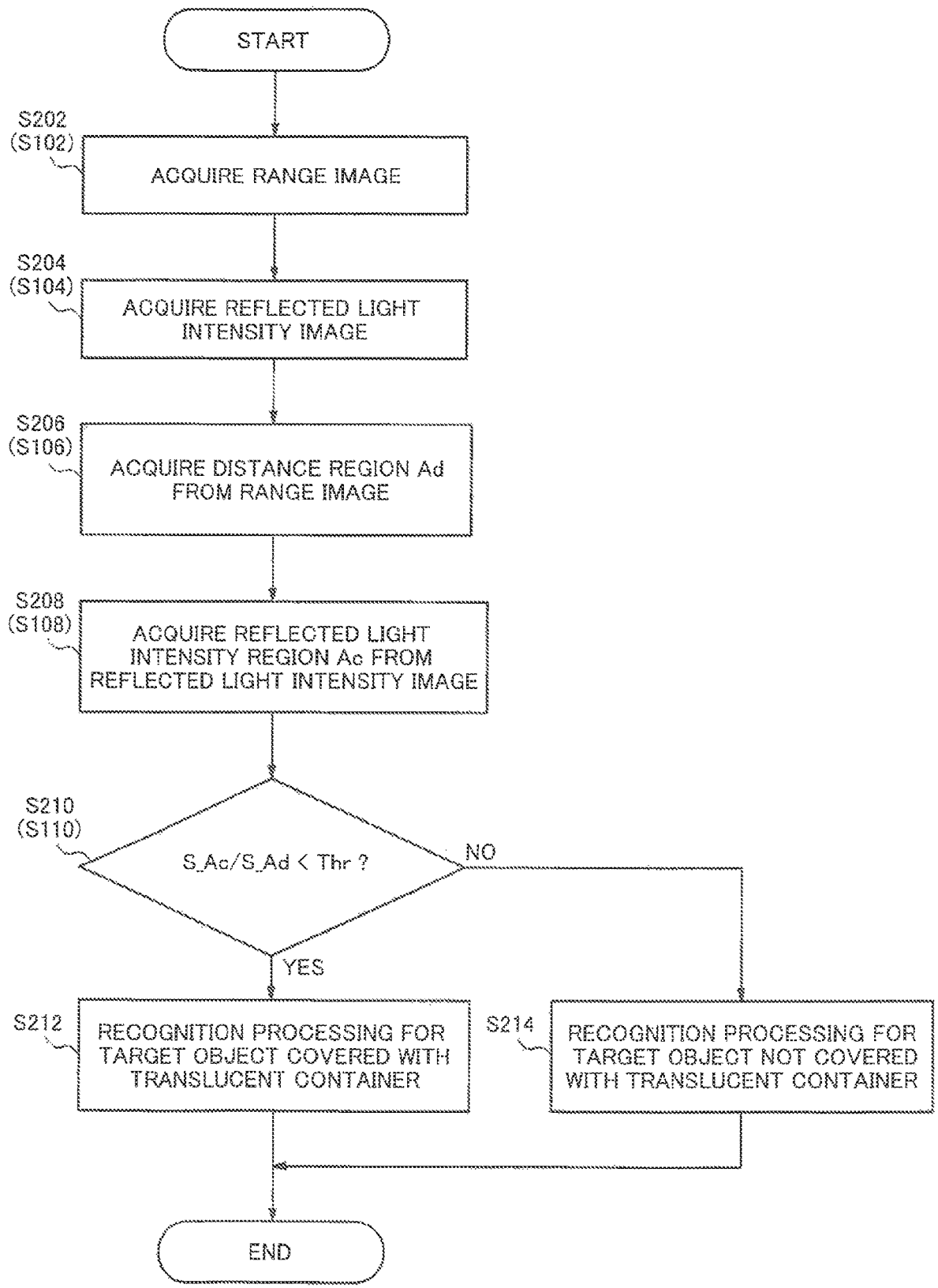
FIG. 12 is a flowchart illustrating a processing performed by the object detection device according to the second exemplary embodiment.

FIG. 11 is a functional block diagram of the object detection device 300 according to the second exemplary embodiment. FIG. 12 is a flowchart illustrating a processing performed in the object detection device 300 according to the second exemplary embodiment. The object detection device 300 includes an object detector 320. The object detector 320 includes the range image acquisition unit 202, the reflected light intensity image acquisition unit 204, the distance region acquisition unit 206, the reflected light intensity region acquisition unit 208, the target object determination unit 210, an imaging control unit 324, a target object image extraction unit 326, a target object recognition processing unit 328 and a reference data storage unit 330.

The processing performed in the object detector 320 will be described below in detail.

As in step S102, the range image acquisition unit 202 acquires the range image by controlling the range sensor 110 (S202). As in step S104, the reflected light intensity image acquisition unit 204 acquires a reflected light intensity image by controlling the range sensor 110 (S204). As in step S106, the distance region acquisition unit 206 acquires the distance region Ad that is within a range S1 (the first range) of distances from the range sensor 110 in the range image (S206). As in step S108, the reflected light intensity region acquisition unit 208 acquires the reflected light intensity region Ac having reflected light intensity greater than or equal to the intensity threshold Thc in the reflected light intensity image within the distance region Ad (S208). As in step S110, the target object determination unit 210 determines whether the area ratio S_Ac/S_Ad of the area S_Ac of the reflected light intensity region Ac to the area S_Ad of the distance region Ad is less than the predetermined threshold Thr (S210).

If the area ratio S_Ac/S_Ad is less than the threshold Thr (YES at S210), the object detector 320 performs recognition processing to be performed when the target object is covered with the translucent container, as described below (S212). Specifically, in this case, the target object determination unit 210 determines that the target object is covered with the translucent container. Then the imaging control unit 324 causes the imaging unit 312 to capture a two-dimensional image that includes the image of the object A by controlling the imaging unit 312. Specifically, the imaging control unit 324 causes the imaging unit 312 to capture an image of the object A directed toward the three-dimensional camera 310 by controlling the imaging unit 312. The imaging control unit 324 then acquires a two-dimensional image generated by the imaging unit 312 and outputs the two-dimensional image to the target object image extraction unit 326. Note that the two-dimensional image may also include an image of the translucent container (if covered with the translucent container) and an image of the background (background image), in addition to the image of the target object. Because the imaging unit 312 and the range sensor 110 are placed close to one another as noted above, the two-dimensional image corresponds to the range image and the reflected light intensity image.

The target object image extraction unit 326 extracts the image of the target object (target object image) from the two-dimensional image. Specifically, the target object image extraction unit 326 extracts an image region corresponding to the reflected light intensity region Ac from the two-dimensional image as the target object image. More specifically, the target object image extraction unit 326 overlays the reflected light intensity region Ac on the two-dimensional image. The target object image extraction unit 326 determines which of the pixels in the two-dimensional image the pixels in the reflected light intensity region Ac correspond to. Further, the target object image extraction unit 326 identifies a set of the corresponding pixels as an image region corresponding to the target object. Then, the target object image extraction unit 326 extracts the image region as the target object image and outputs the target object image to the target object recognition processing unit 328.

The target object recognition processing unit 328 performs the recognition processing for the target object using the target object image extracted by the target object image extraction unit 326. Specifically, the target object recognition processing unit 328 performs pattern matching between the target object image and reference data of the target object stored in the reference data storage unit 330. The reference data storage unit 330 stores the reference data and the name of object in association with one another.

The reference data storage unit 330 stores not only reference data for target object that is not covered with the translucent container but also reference data for target object covered with the translucent container. Because it has been determined by the target object determination unit 210 that the target object is covered with the translucent container, the target object recognition processing unit 328 performs pattern matching with the target object image using the reference data for the target object covered with the translucent container at step S212.

If the area ratio S_Ac/S_Ad is greater than or equal to the threshold Thr (NO at S210), the object detector 320 performs the recognition processing concerning the case that the target object is not covered with the translucent container (S214). Specifically, the target object determination unit 210 in this case determines that the target object is not covered with the translucent container (i.e. the target object is exposed). Then the imaging control unit 324 and the target object image extraction unit 326 perform respectively processing similar to step S212 and acquire the target object images.

The target object recognition processing unit 328 performs the recognition processing for the target object using the target object image extracted by the target object image extraction unit 326. Specifically, at step S214, because the target object determination unit 210 determines that the target object is not covered with the translucent container, the target object recognition processing unit 328 performs the pattern matching between the target object image and the reference data for the target object that is not covered with the translucent container (i.e. reference data concerning the object itself) which are stored in the reference data storage unit 330.

If the target object is covered with the translucent container, the target object image includes the image of the target object that passes through the translucent container.

Specifically, in this case, the target object image has a color, creases, a printed pattern or the like of the translucent container overlaid on the surface of the target object. Therefore, unless performing the recognition processing in consideration of a difference whether the target object is covered with the translucent container, the recognition rate is likely to decrease.

In contrast, in the present exemplary embodiment, if the target object determination unit 210 determines that the target object is covered with the translucent container, the target object recognition processing unit 328 performs the recognition processing to target object using the reference data in the case that the target object covered with the translucent container. If the target object determination unit 210 determines that the target object is not covered with the translucent container, the target object recognition processing unit 328 performs the recognition processing to the target object using reference data for the target object that is not covered with the translucent container. In other words, the target object recognition processing unit 328 in the present exemplary embodiment performs the recognition processing to the target object by distinguishing between the first situation in which the target object is covered with the translucent container and the second situation in which the target object is not covered with the translucent container. Thus, it is possible to improve the target object recognition rate regardless of whether the target object is covered with the translucent container.

The reference data will be illustrated below. For example, the reference data may be an image serving as a reference for an object (an object reference image). In that case, the target object recognition processing unit 328 compares the extracted target object image with the object reference image. If the similarity between the two images is an acceptable value, the target object recognition processing unit 328 associates the target object with the object name corresponding to the object reference image. In this case, the object reference image includes an image of the object covered with the translucent container and an image of the object that is not covered with the translucent container.

The reference data may be data representing a feature serving as a reference for the target object (object feature data), for example. The object feature data may include at least one of information representing the shape of the object, information representing the color of the object, information representing the texture (such as luster) of the object, information representing character put on the surface of the object, and information representing pattern put on the surface of the object. In this case, the target object recognition processing unit 328 extracts a feature of the image from the extracted target object image. Next, the target object recognition processing unit 328 compares the extracted feature of the image with the object feature data. If the similarity between them is an acceptable value, the target object recognition processing unit 328 associates the target object with the object name corresponding to the object feature data. In this case, the object feature data includes data representing a feature of the object covered with the translucent container and data representing a feature of the object that is not covered with the translucent container.

The target object recognition processing unit 328 may read character information put on the surface of the target object with an OCR (Optical Character Reader) and recognize the object name. In this case, the target object recognition processing unit 328 may change the precision or the like of the OCR as appropriate depending on whether the target object is covered with the translucent container.

Note that although the reference data storage unit 330 stores not only reference data for the target object that is not covered with the translucent container but also reference data for the target object covered with the translucent container in the exemplary embodiment described above, data storing the reference data storage unit 330 is not limited to those. The reference data storage unit 330 may store only reference data for the target object that is not covered with the translucent container.

In that case, when the target object determination unit 210 determines that the target object is not covered with the translucent container, the target object recognition processing unit 328 performs the recognition processing for the target object using the stored reference data. On the other hand, when the target object determination unit 210 determines that the target object is covered with the translucent container, the target object recognition processing unit 328 removes information on the translucent container from the target object image and performs the recognition processing for the target object using the stored reference data. Having this configuration, it is not necessary to store the reference data for the target object covered with the translucent container. Therefore, the configuration allows the recognition rate to increase while saving resource.

For example, when the target object is covered with the translucent container, the target object image tends to become whitish. Therefore, when it is determined that the target object is covered with the translucent container, the target object recognition processing unit 328 may decrease the luminance value of each of the RGB (Red-Green-Blue) of the pixels in the target object image and performs the pattern matching with the stored reference data. Further, if the translucent container is a plastic bag, for example, a printed pattern on the surface of the target object is hard to appear in the target object image due to creases of the bag. To address this, the target object recognition processing unit 328 may decrease importance of the printed pattern on the object in the stored reference data and perform the pattern matching. Further, the target object recognition processing unit 328 may determine that a crease-like image appeared in the target object image represents creases of a plastic bag or the like and may remove the crease-like image from the target object image. Thereafter, the target object recognition processing unit 328 may perform the pattern matching with the stored reference data, for example.

The recognition processing for the target object is performed using a two-dimensional image of the target object captured with an imaging unit 312 in the exemplary embodiment described above. However, the recognition processing is not limited to this manner. For example, the target object recognition processing unit 328 may recognize the shape (outline) of the target object based on the shape of the reflected light intensity region Ac. In that case, the target object recognition processing unit 328 may perform the recognition processing for the target object by pattern matching between the outline of the target object and the outline of an object indicated in reference data. Alternatively, the target object recognition processing unit 328 may recognize projections and depressions of the surface of the target object from distance values indicated by the pixels in a range image that correspond to the reflected light intensity region Ac, for example. In this case, the target object recognition processing unit 328 may perform the recognition processing for the target object by the pattern matching of projections and depressions of the surface of the target object with projections and depressions of the surface of an object indicated in reference data. In this regard, it is possible to improve the recognition rate by using a two-dimensional image because the two-dimensional image allows the use of information about colors of the target object in recognition processing.

Third Exemplary Embodiment

A third exemplary embodiment will be described next. The third exemplary embodiment illustrates an example of application of an object detection device 300 according to the second exemplary embodiment. Note that components that are in essence similar to those of the first and second exemplary embodiments are given the same reference numerals and the description of those components will be omitted.

Figure 13:
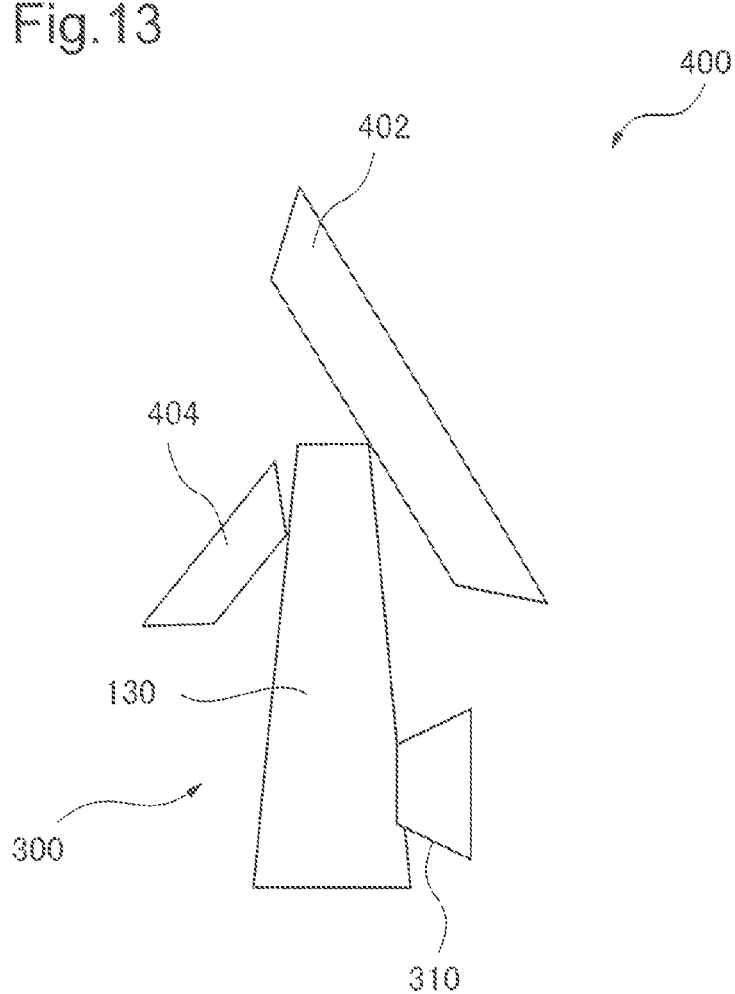
FIG. 13 is a diagram illustrating a POS terminal device according to a third exemplary embodiment.

FIG. 13 is a diagram illustrating a POS terminal device 400 according to the third exemplary embodiment. The POS terminal device 400 according to the third exemplary embodiment includes the object detection device 300 according to the second exemplary embodiment (an information processing apparatus 130 and a three-dimensional camera 310). The POS terminal device 400 includes a cashier display console 402, a customer display unit 404, the information processing apparatus 130 and the three-dimensional camera 310, which is a commodity item reader. The POS terminal device 400 is placed on a counter (not depicted), for example, and a customer who is on the left side of FIG. 13 and a cashier who is on the right side of FIG. 13 face with the POS terminal device 400 between them.

The cashier display console 402 is a touch panel, an LCD (Liquid Crystal Display), a keyboard or the like, for example. The cashier display console 402 displays required information to a cashier and accepts cashier operations under the control of the information processing apparatus 130.

The customer display unit 404 is a touch panel, an LCD or the like, for example. The customer display unit 404 displays required information to a customer under the control of the information processing apparatus 130. The customer display unit 404 may include an input device and may accept customer operations as needed.

The three-dimensional camera 310, which acts as a commodity item reader, is placed on the cashier's side. Therefore, the three-dimensional camera 310 can be directed toward a commodity item when it is necessary that an image of the commodity item is captured (read). When the cashier directs the commodity item received from a customer toward the three-dimensional camera 310, the three-dimensional camera 310 captures an image of the commodity item. The POS terminal device 400 performs the recognition processing for the commodity item based on the captured image.

Further, the POS terminal device 400 includes a function similar to the function of the object detector 320 according to the second exemplary embodiment. Specifically, like the object detection device 300 according to the second exemplary embodiment, the POS terminal device 400 determines whether a commodity item is covered with the translucent container using the range image and the reflected light intensity image generated by the three-dimensional camera 310. The POS terminal device 400 then performs the recognition processing for the commodity item by distinguishing between the first situation in which the commodity item is covered with the translucent container and the second situation in which the commodity item is not covered with the translucent container. Thus, it is possible to improve the commodity item recognition rate regardless of whether the commodity item is covered with the translucent container.

Variations

The present invention is not limited to the exemplary embodiments described above. The present invention is allowable to modify properly the exemplary embodiments without departing from the spirit of the present invention. For example, the steps of the processing in the flowcharts described above can be reordered as appropriate. Moreover, at least one of the multiple steps in the flowcharts described above may be omitted. For example, step S102 in the flowchart of FIG. 5 may be performed after step S104. Similarly, step S104 may be performed after step S106. The same applies to the flowchart of FIG. 12.

In the flowchart of FIG. 12, the imaging control unit 324 causes the imaging unit 312 to capture a two-dimensional image including the image of the object A at step S212 or step S214. However, the present invention is not limited to this configuration. The imaging step may be performed at any timing before step S210.

The configuration of the POS terminal device according to the third exemplary embodiment is applicable to a self-checkout counter, for example. Further, although the configuration according to the third exemplary embodiment is applied to a POS terminal device, the configuration of the third exemplary embodiment is not limited to the POS terminal device. For example, the above configuration is also applicable to a commonly used object recognition apparatus such as an object recognition apparatus used for sorting goods at a warehouse or the like, and to a system including the object recognition apparatus. The above configuration is also applicable to a robot that is capable of recognizing objects.

While the TOF method is used to measure the distance to an object in the exemplary embodiments described above, the measurement manner of the distance is not limited to that manner. For example, the distance to an object may be measured using manner for measuring the distance using the parallax between two imaging units, for example. While a range sensor is used to measure both of the distance and reflected light intensity in the exemplary embodiments described above, the measurement manner of the distance and reflected light intensity is not limited to that manner. For example, the device using the parallax is utilized in the measurement of the distance. The device to measure the reflected light intensity may be distinct from the device to measure the distance.

However, the use of the range sensor to measure both the distance and reflected light intensity allows to avoid the increase of the number of devices because a single device by itself can measure both the distance and reflected light intensity.

Further, while the range image generation unit 116 and the reflected light intensity image generation unit 118 are provided in the range sensor 110 in the exemplary embodiments described above, the present invention is not limited to this configuration. For example, at least one of the range image generation unit 116 and the reflected light intensity image generation unit 118 may be implemented by the information processing apparatus 130. In this case, the range sensor 110 may output information on the measured distance and position (pixel) corresponding to the measured distance and information on the reflected light intensity and position (pixel) corresponding to the reflected light intensity to the information processing apparatus 130. The information processing apparatus 130 may generate at least one of a range image and a reflected light intensity image using these items of information.

The program may be stored in any of various types of non-transitory computer readable media and provided to a computer from the non-transitory computer readable media. The non-transitory computer readable media include various types of tangible storage media. Examples of non-transitory computer readable medium include a magnetic recording medium (for example a flexible disk, a magnetic tape, or a hard disk drive), a magneto-optical recording medium (for example a magneto-optical disk), a CD-ROM (Read Only Memory), a CD-R, a CD-R/W, and a semiconductor memory (for example a mask ROM, a PROM (Programmable ROM), an EPROM (Erasable PROM), a flash ROM, or a RAM (Random Access Memory)). The program may be provided to a computer via any of various types of transitory computer readable media. Examples of transitory computer readable medium include electrical signal, optical signal, and electromagnetic wave. The transitory computer readable medium is capable of providing the program to a computer through a wire communication path such as an electrical cable and an optical fiber or a wireless communication path.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-033028, filed on Feb. 24, 2014, the disclosure of which is incorporated herein in its entirety by reference.

REFERENCE SIGNS LIST

1 Object detection device
2 Distance measurement unit
4 Irradiation unit
6 Reflected light intensity measurement unit
8 Target object determination unit
100 Object detection device
110 Range sensor
112 Infrared irradiation unit
114 Infrared receiving unit
116 Range image generation unit
118 Reflected light intensity image generation unit
130 Information processing apparatus
132 Control unit
134 Storage unit
200 Object detector
202 Range image acquisition unit
204 Reflected light intensity image acquisition unit
206 Distance region acquisition unit
208 Reflected light intensity region acquisition unit
210 Target object determination unit
212 Processing execution control unit
300 Object detection device
310 Three-dimensional camera
312 Imaging unit
320 Object detector
324 Imaging control unit
326 Target object image extraction unit
328 Target object recognition processing unit
330 Reference data storage unit
400 POS terminal device

The invention claimed is:

1. An object detection device comprising:
a range sensor that measures distance to a plurality of positions of an object facing itself;
an irradiator that emits light ray onto the object; and
a processor configured to:
measure intensities of light rays emitted by the irradiator and reflected at the plurality of positions of the object; and
determine whether a target object is covered with a translucent container based on a first region and a second region, the first region representing a region where the distance measured by the range sensor is within a predetermined first range, the second region representing a region where the measured intensity of reflecting light ray is greater than or equal to a predetermined intensity threshold.

2. The object detection device according to claim 1, wherein when a ratio of area of the second region to area of the first region is less than a predetermined value, the processor determines that the target object is covered with the container.

3. The object detection device according to claim 1, wherein the range sensor includes the irradiator and detects the distance to the object using the irradiator.

4. An object detection method comprising:
measuring distance to a plurality of positions of an object;
emitting light rays onto the object;
measuring intensities of the light rays emitted onto the object and reflected at the plurality of positions of the object; and
determining whether a target object is covered with a translucent container based on a first region and a second region, the first region representing a region where the measured distance is within a predetermined first range, the second region representing a region where the measured intensity of reflecting light ray is greater than or equal to a predetermined intensity threshold.

5. The object detection method according to claim 4, wherein when a ratio of area of the second region to area of the first region is less than a predetermined value, it is determined that the target object is covered with the container.

6. A non-transitory program recording medium storing a program for causing a computer to perform the steps of:
acquiring distance to a plurality of positions of a facing object;
acquiring intensities of light rays emitted onto the object and reflected at the plurality of positions of the object; and
determining whether a target object is covered with a translucent container based on a first region and a second region, the first region representing a region where the acquired distance is within a predetermined first range, the second region representing a region where the acquired intensity of reflecting light ray is greater than or equal to a predetermined intensity threshold.

7. The object detection method according to claim 4, wherein, in measurement of the distance to the plurality of positions of the object, using a range sensor including an irradiator which emits light ray onto the object.

8. The non-transitory program recording medium according to claim 6, stores a program for causing a computer to perform the steps of, when a ratio of area of the second region to area of the first region is less than a predetermined value, determining that the target object is covered with the container.

9. The non-transitory program recording medium according to claim 6, stores a program for causing a computer to perform the steps of, measuring of the distance to the plurality of positions of the object by using output of a range sensor including an irradiator which emits light ray onto the object.

\* \* \* \* \*